US007165237B2

(12) United States Patent
Thiruvillamalai

(10) Patent No.: US 7,165,237 B2
(45) Date of Patent: Jan. 16, 2007

(54) DATA STORE FOR ARBITRARY DATA TYPES WITH TYPE SAFE STORAGE AND RETRIEVAL

(75) Inventor: Varadarajan Thiruvillamalai, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 767 days.

(21) Appl. No.: 10/394,978

(22) Filed: Mar. 20, 2003

(65) Prior Publication Data

US 2004/0187100 A1 Sep. 23, 2004

(51) Int. Cl.
*G06F 9/44* (2006.01)
*G06F 9/45* (2006.01)
(52) U.S. Cl. ............... 717/108; 717/143; 717/114
(58) Field of Classification Search ........... 717/108, 717/143, 114, 1; 709/217, 226; 707/10, 707/103 R; 713/1
See application file for complete search history.

(56) References Cited

U.S. PATENT DOCUMENTS

| 5,500,881 | A | * | 3/1996 | Levin et al. ............... 717/141 |
|---|---|---|---|---|
| 5,550,563 | A | * | 8/1996 | Matheny et al. ............. 345/168 |
| 5,748,966 | A | * | 5/1998 | Sato ........................ 717/131 |
| 6,289,382 | B1 | * | 9/2001 | Bowman-Amuah ......... 709/226 |
| RE37,722 | E | * | 5/2002 | Burnard et al. .............. 713/1 |
| 6,477,580 | B1 | * | 11/2002 | Bowman-Amuah ......... 709/231 |
| 6,529,909 | B1 | * | 3/2003 | Bowman-Amuah ......... 707/10 |
| 6,529,948 | B1 | * | 3/2003 | Bowman-Amuah ......... 709/217 |
| 6,574,636 | B1 | * | 6/2003 | Balon et al. ............. 707/103 R |
| 6,601,234 | B1 | * | 7/2003 | Bowman-Amuah ......... 717/108 |
| 6,704,743 | B1 | * | 3/2004 | Martin .................. 707/103 R |

OTHER PUBLICATIONS

Rational Rose/C++ Round Trip Engineering with Rational Rose/C++, Rational Software Corporation, 1996, whole manual.*
"Compiler Principles, Techniques and Tools", Alfred Aho et al., published Sep. 12, 1985, Chapters 1-6.*
SNAP Foundation Template Using the SNAP Language, Template Software, 1997, pp. 3-16-3-21.*
A Genetic Algorithm for Optimising Problems With Multiple Disparate Data Types, Gary M. Gibson, ACM, 1995, pp. 300-304.*
On Understanding Types, Data Abstraction and Polymorphism, Luca Cardelli et al, ACM, 1986, pp. 471-522.*
Designing Families of Data Types Using Exemplars, Wilf R. LaLonde, ACM, 1989, pp. 212-248.*

* cited by examiner

*Primary Examiner*—Todd Ingberg
(74) *Attorney, Agent, or Firm*—Workman Nydegger

(57) ABSTRACT

A compile-time data store that contains arbitrary data types is accessed via methods that ensure type safety. A type construct (e.g., a C++ template) is instantiated at compile time and generates a data store that contains arbitrarily-typed data objects, such as integers, characters, pointers and so forth. The construct includes a Put method to put any element (object) of a listed type (e.g., of a typelist) in the data store, and a Get method to retrieve the element from the data store. The Put method maintains a type index in association with each stored in the data store. The Get method validates that the type of object that was requested in the call to the Get method matches the object type that was stored in the Put method. When run, the Get method returns the element data upon a type match, otherwise the Get method generates an exception.

20 Claims, 2 Drawing Sheets

US 7,165,237 B2

DATA STORE FOR ARBITRARY DATA TYPES WITH TYPE SAFE STORAGE AND RETRIEVAL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to computer systems, and more particularly to data storage and retrieval.

BACKGROUND OF THE INVENTION

In many computer programming languages, variables in a program have to be declared with a type, such as integer, character, float, and so forth, and thereafter the program needs to abide by type rules. Compiled computer languages that are type safe, such as the C++ programming language, check for type consistency at compile time. One way that type consistency is ensured is by requiring that arrays hold homogenous types of data. For example, if a programmer defines an array to hold integers, the compiler can check whether the program later commands that a non-integer type (e.g., character) be retrieved from that array. If so, the compiler generates an error, whereby that program code cannot be linked into an executable program, which is beneficial because such a type safety violation otherwise would cause instability and unpredictability in the executable program.

Such strongly-typed languages thus provide many benefits, but at the same time create difficulties and other problems for programmers. For example, consider a test framework that tests other programs with various parameters and test conditions, and thus generates various types of data. Because an array can be defined to hold only one type of data, in order to store arbitrary/generic (non-polymorphic) data in a standard data store, a programmer is left with only a few choices as to how to handle such data.

One way to store the data is to simply store it as is, by defining an array of void pointers, e.g., void * array [X], and then storing the data absent type, e.g., array[0]=(void*)&1. However, because the type of the store is void, such a storage technique forfeits type safety, as there is no way with such a generic store to know what any given element's data type is. Consequently, when compiled, any source code that retrieves that element from the array cannot be checked as to whether the element's specified data type when retrieved matches its data type when stored. For example, the element stored into the void pointer array may correspond to an integer, but if that element was retrieved from the array by a command that requested a character pointer, nothing in the compiler is able to detect the error. As can be readily appreciated, the program module will thus compile, but the resultant executable program likely will be highly unstable and/or yield unpredictable or incorrect results.

Other ways to store such arbitrary data include forcing these different types to belong to the same base class, and introducing an artificial design constraint to force polymorphism. As can be appreciated, this technique makes the program unnecessarily complex. Yet another way to handle arbitrary data storage is to have a closed list of types with an identifier (e.g., 0, 1 . . . n) for each type. Then, at run time, a (likely very large) switch statement, e.g., case [0] . . . case [1] . . . to case [n] . . . , can be used to return the appropriate typed variable. This suffers from the problem that the list of types is closed, and the switch statement needs to be programmed to handle every type.

SUMMARY OF THE INVENTION

Briefly, the present invention provides a type construct (e.g., a C++ template) that at compile time is instantiated to generate a unique type of data store that can hold listed types of arbitrarily typed data objects, such as integers, characters, pointers and so forth. The construct provides methods to access the data store in a manner that allows any object of a listed type (e.g., listed in a typelist) to be put in the data store, via a Put method, and later retrieved from the data store, via a Get method. The Put method maintains a type index in association with each element (object) stored in the data store. The Get method validates that the type of object that was requested in the call to the Get method matches the object type that was stored in the Put method. The Get method returns the element data if there is a type match, otherwise the Get method generates (throws) a run-time exception.

In one example implementation, the construct comprises data store template code, which when instantiated and executed (e.g., by a compiler as part of the compiling process), produces a type safe data store to contain arbitrary types of data. The data store is constructed according to a typelist that identifies the types of data that the data store is to contain. During the compilation process, the compiler instantiates a version of the Put and Get methods of the data store template code to store and retrieve the arbitrarily-typed data. The Put method stores type information (such as a type index) in association with each type of data stored in the store, that is, the store internally organizes the data such that each type is associated with an index.

When a call to the Get method is received for a stored element, the get method code determines whether the data type for the requested element matches the type index stored with the element referenced by the given key. If so, the Get method returns the data of the requested element (its value) from the data store, otherwise the Get method generates a run-time exception.

The present invention thus includes a method directed towards receiving requests from a compiler that is compiling source code, including requests to store elements of at least two different data types, and requests to retrieve at least some of the stored elements. In response to a request to store an element having a data type and a key, the executing storage method code stores the element in a data store according to the key and in association with data type information. Retrieval method code executes in response to a request to retrieve an element based on its key, including comparing the data type information associated with the requested element with data type information provided for the element in conjunction with the retrieval request, and if the type information matches, returning the element in response to the request, and if the type information does not match, generating an exception.

A system includes a compile-time construct that generates a data store in which arbitrary types of data elements are stored based on a key, the compile-time construct having mechanisms instantiated by a compiler to provide access to the data store, including a storage mechanism and a retrieval mechanism. The storage mechanism stores an element having a data type and a key provided from the compiler in the data store according to the key and in association with data type information. The retrieval mechanism validates that an element requested by the compiler via its key and having a specified data type corresponds to the associated data type information of that element in the data store, and if so, returns data of the element in response to the request, and if not, generates an exception.

In another system, a compiler includes means for compiling source code into compiled code, and a compile-time construct means instantiated by the compiler includes means for generating a data store to contain data of arbitrary types as stored elements referenced by keys. A storage means is provided for receiving an element having a data type from the compiler in a request to store the element as referenced by a key, the storage means storing the element in the data store referenced by the key and in association with data type information. A retrieval means operates in response to a request from the compiler to return an element referenced by a key and having a specified data type, the retrieval means validating that the specified data type corresponds to the data type information associated with the element in the data store. If so, the retrieval includes means for returning data of the element in response to the request, and if not, the retrieval means includes means for generating an exception.

Other advantages will become apparent from the following detailed description when taken in conjunction with the drawings, in which:

DETAILED DESCRIPTION

Exemplary Operating Environment

Figure 1:
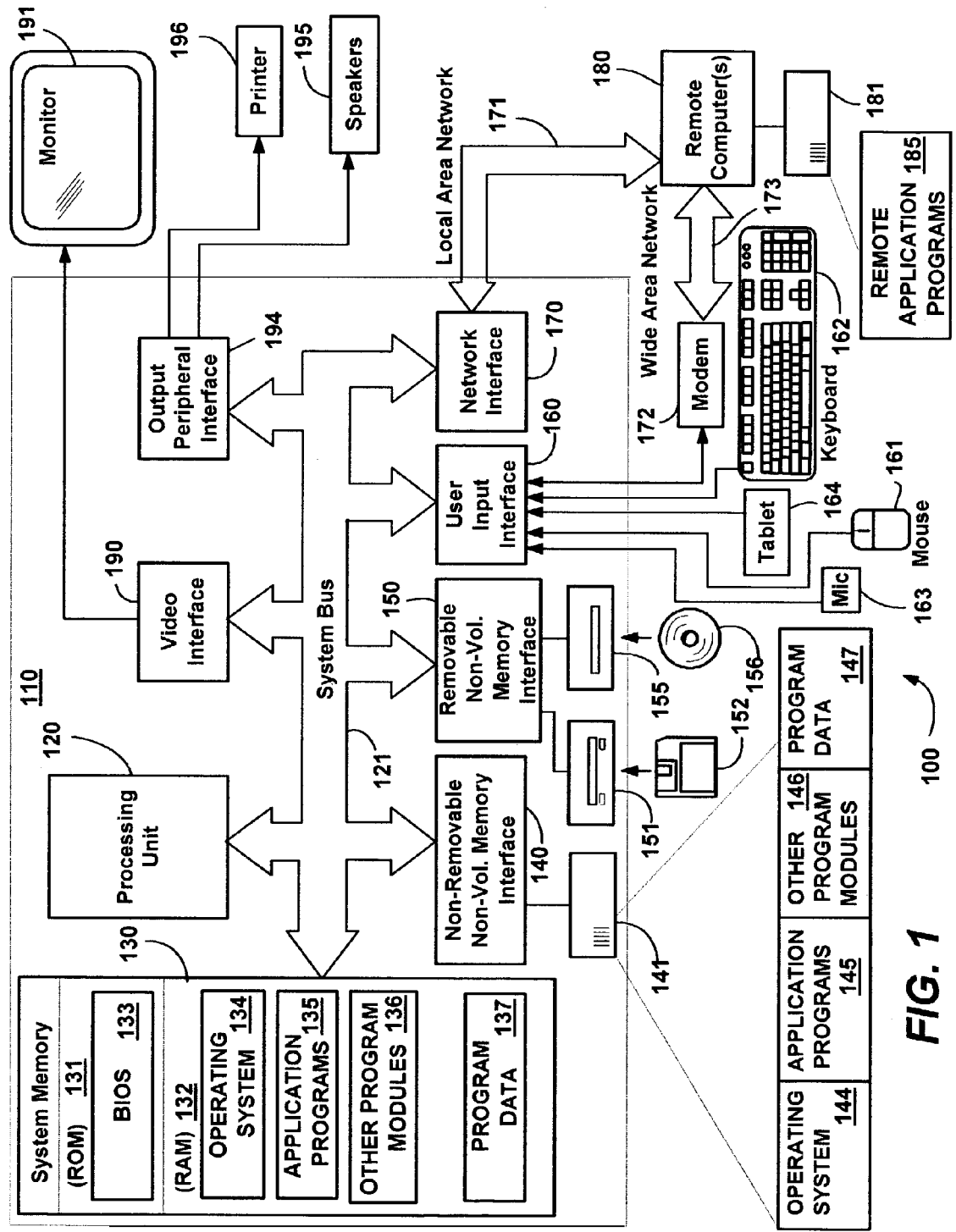
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Type Safe Data Store with Arbitrary Data Types

In general, the present invention provides a type construct (e.g., a C++ template) that at compile time generates a unique type of store to hold a list of known types of arbitrarily typed data objects, such as integers, characters, pointers and so forth. The construct provides methods (functions or equivalent mechanisms) for accessing the data store in a manner that allows any object of a listed type (e.g., listed in a typelist) to be put in the data store, via a Put method, and later retrieved from the data store, via a Get method. In accordance with an aspect of the present invention, the Put method maintains a type index in association with each element (object) stored in the data store. The Get method validates that the type of object that was requested in the call to the Get method matches the object type that was stored in the Put method. The Get method returns the element data if there is a type match, otherwise the Get method generates (throws) an exception.

Among other characteristics, C++ templates comprise compile-time programs that perform code generation by selectively emitting code as they are processed by a compiler, a technology sometimes referred to as template metaprogramming. In other words, instead of simply processing source code into compiled code, a compiler runs code in a template. As the code in the template is executed, the code determines the program that is ultimately produced. The present invention utilizes template functionality to provide a type safe data store that can contain arbitrary types of data at compile time, including validating that the type of a data object that is requested from the data store matches the type of data object as stored. Note that while the present invention was originally implemented in a C++ programming environment using template functionality, it should be understood that the present invention is not limited to any particular programming language, but instead can be used with any programming language having similar features.

Figure 2:
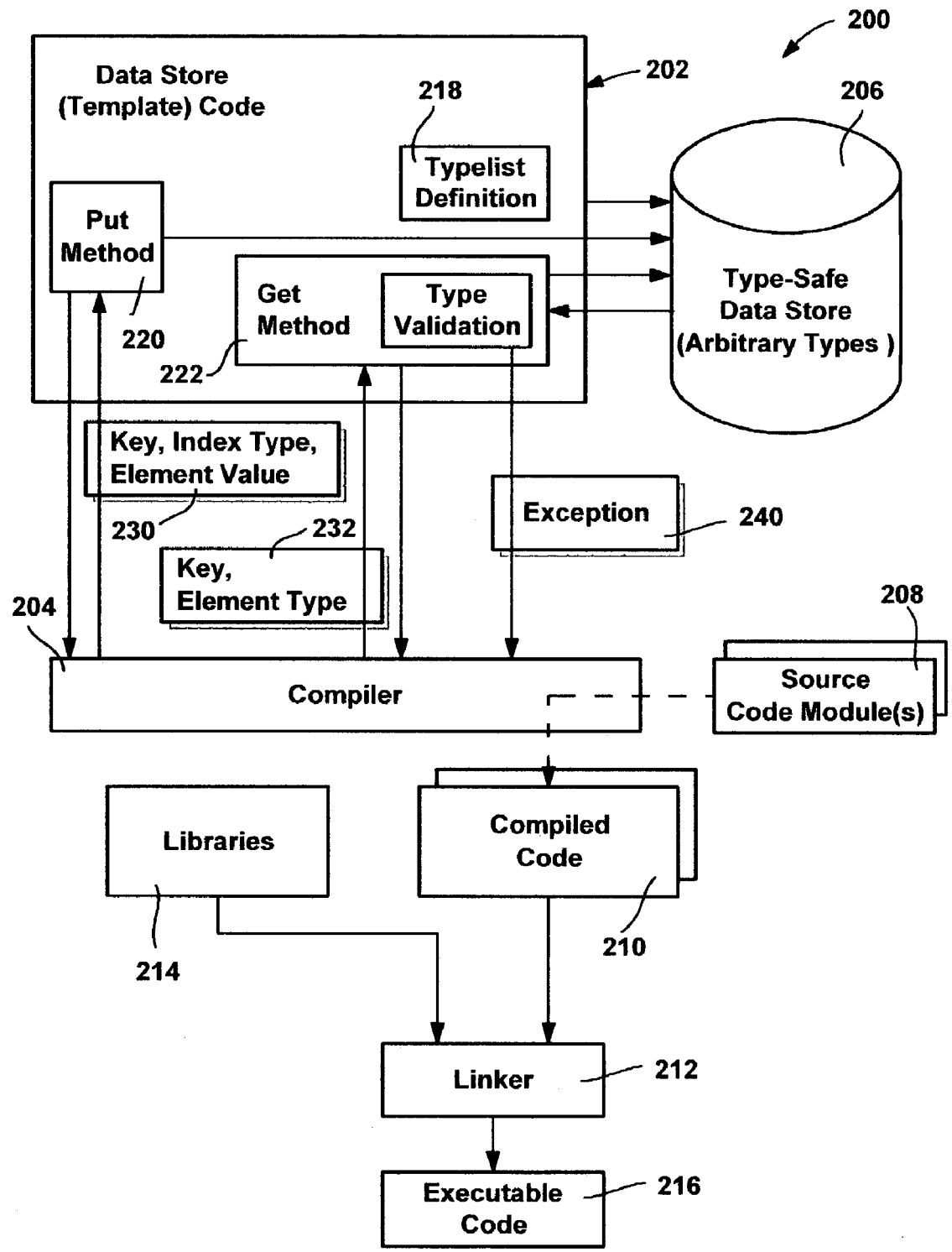
FIG. 2 is a block diagram representing a general architecture into which the present invention may be incorporated, including components for providing a type safe data store that contains arbitrary data.

As represented in FIG. 2 of the drawings, an example implementation 200 includes data store template code 202, which when executed by a compiler 204 as part of the compiling process, produces a type safe data store 206 that can contain arbitrary types of data, in accordance with an aspect of the present invention. Once constructed, as one or more source code modules 208 that store and retrieve arbitrary data types of data are processed by the compiler 204 into compiled code 210, during the compilation process the compiler 204 calls methods of the data store template code 202. In the event that the (one or more) source code modules 208 compile without any errors detected, a linker 212 combines the resulting compiled code 210 and libraries 214 (e.g., of common functions) into executable program code 216.

To construct the data store 204, at instantiation of the template code 202, the compiler 206 provides a list of the types (a typelist definition 218) of data that the data store 202 will need to store. For example, the following typelist indicates that integers and characters, which are unrelated types, can be stored in the data store:
CDataStore<Loki::TL::MakeTypeList<int, char>::Result> store;

Note that the typelist 218 may be provided by an appropriate one of the source code modules 208, although it is alternatively feasible to provide the typelist 218 in some other manner, such as by reading in the typelist definition from a file (e.g., performed with a preprocessing step, outside the scope of the compiler), having various data store templates each with a typelist hardcoded into it and then selecting an appropriate data store template, and so on. Note that the typelist 218 is a type (as known from its use in design patterns), and thus can have data objects of that type contained in a single array, however the typelist 218 may be used to define a list of arbitrary types of objects. Typelists are described in the reference by Andrei Alexandrescu entitled "Modern C++ Design: Generic Programming and Design Patterns Applied."

To store and retrieve the arbitrarily-typed data, the compiler calls a Put method 220 of the data store template code 202, and a Get method 222, respectively. For example, in one implementation the data store 202 comprises an object instantiated by the compiler and having object interfaces, such as a Put method interface and a Get method interface. In accordance with an aspect of the present invention, the Put method stores type information (such as a type index) in association with each type of data stored in the store, that is, the store internally organizes the data such that each type is associated with an index. More particularly, as represented in FIG. 2, during compile time, when the compiler 204 calls the Put method 220 of the data store 202, passing parameters 230 comprising a key, a type and a value of that type to store in association with that key, the compiler instantiates a version of Put method with code to store the element as well as the index of the type of element. When a call to the Get method 222 with parameters 232 happens for the same element, the data store template code 202 receives the Get parameters 232, and determines whether the index of the type passed to the Get method 222 matches the index stored with the element at this key. If so, the data store template code 202 returns the requested element value from the store 206 to the caller (the compiler 204), otherwise the data store template code 202 (e.g., via the Get method) generates an exception 240.

The following table sets forth example code for the Put method 220 that stores a pointer to an object, along with the index information for the type of object pointer:

```
template <class T>
    void Put(const Key& key, T* value)
{
    int index = Loki::TL::IndexOfStrict<TypeList, T>::value;
```

-continued

```
    Value val;
    val.ptrValue__ = (void *)value;
    val.typeIndex__ = index;
    map__[key] = val;
}
```

The following table shows example code for the Put method that stores a typed object, along with the type index for the type of object:

```
template <class T>
    void Put(const Key& key, T value)
{
    typedef typename Loki::TypeTraits<T>::ParameterType U;
    int index = Loki::TL::IndexOfStrict<TypeList, U>::value;
    Value val;
    val.ptrValue__ = new T(value);
    val.typeIndex__ = index;
    map__[key] = val;
}
```

The following table shows example code for the Get method 222 that retrieves a pointer to a typed object, along with the type index for the pointer type. Note that the Get method 222 includes verification code (in an if-then format) that ensures that the type of object pointer that is being requested matches the type of object pointer stored:

```
template <class T>
    void Get(const Key& key, T** pvalue)
{
    int index = Loki::TL::IndexOfStrict<TypeList, T>::value;
    Value val = map__[key];
    if (val.typeIndex__ != index)
    {
        throw std::invalid_argument("Bad type");
    }
    *pvalue = (T*)val.ptrValue__;
}
```

The following table shows example code for the Get method 222 that retrieve a typed object, along with the type index for the object. Note that the Get method 222 includes verification code (in an if-then format) that ensures that the type of object pointer that is being requested matches the type of object pointer stored:

```
template <class T>
    void Get(const Key& key, T* pvalue)
{
    int index = Loki::TL::IndexOfStrict<TypeList, T>::value;
    Value val = map__[key];
    if (val.typeIndex__ != index)
    {
        throw std::invalid_argument("Bad type");
    }
    *pvalue = *((T*) (val.ptrValue__));
}
```

Note that when a typed object is passed in, (not a pointer to the object), the data store code allocates a new type of that object, so that users of the class need not be concerned with the lifetime of temporary objects.

The following example describes use of a data store 206 in which a typelist lists at least character pointers, integer pointers and integers as being capable of being stored in the type safe data store 206. Note that the Put and Get methods 220 and 230, respectively, are called by the commands store.Put and Store.Get, and that the format is L, key string, value, (where L specifies the Unicode format to the compiler 204).

In this example, the source code module 208 makes the following definitions:

char *aa;
int *bb;
int cc;
aa=new char;
bb=new int;
*aa='a';
*bb=3;
cc=10;

Then, the source code module 208 requests that the various types for various keys be put into the store in association with type data via the Put method 220:

```
// Put the values into the store;
store.Put(L"abc", aa);
store.Put(L"def", bb);
store.Put(L"ghi", cc);
```

Later, the source code module 208 requests that the same data be retrieved from the data store 206 and type validated via the Get method 222:

```
// Get the values back from the store
store.Get(L"abc", &aa);
store.Get(L"def", &bb);
store.Get(L"ghi", &cc);
```

Assuming that the source code properly compiled and the compiled code was linked into an executable program, when executed, if a function outputs the results of what was retrieved, e.g., printf("Store contains % c:% d: % d.\n", *aa, *bb, cc); the function would produce the following output: Store contains a:3:10.

However, in this example, if a line in the source code being compiled requested retrieval of the data, for example keyed by "ghi" with a mismatched type, such as:

store.Get(L"ghi", aa)

when the program is run, there will be an invalid_argument exception, because the "ghi" key has stored an integer, but the aa type indicates that a character was being sought. As described above, because the type was stored in association with this key by the Put method 220, the Get method 222 retrieves the type as well as the value, and generates the exception 240 because of the type mismatch.

As can be seen from the foregoing detailed description, there is provided a compile time construct, that when instantiated and executed generates a type-safe data store for storing arbitrary data type objects. Methods of the construct, through which the data store is accessed, ensure type safety. Programs coded in programming languages that allow only one data type per array can thus have arbitrary data maintained in an array, yet still provide type safety checking during compilation.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system, a method, comprising:
receiving requests from a compiler compiling source code, including requests to store elements of at least two different data types, and requests to retrieve at least some of the stored elements;
executing storage method code in response to a request to store an element having a data type and a key, the storage method code storing the element in a data store according to the key and in association with data type information; and
executing retrieval method code in response to a request to retrieve an element based on its key, the retrieval method code comparing the data type information associated with the requested element with data type information provided for the element in conjunction with the retrieval request, and if the type information matches, returning the element in response to the request, and if the type information does not match, generating an exception.

2. The method of claim 1 further comprising, creating the data store.

3. The method of claim 2 wherein creating the data store comprises obtaining a typelist that indicates types of data that the data store is to contain.

4. The method of claim 2 further comprising, receiving the typelist from the compiler.

5. A computer-readable medium having computer-executable instructions for performing the method of claim 1.

6. The method of claim 1 wherein storing elements of at least two different data types further comprises storing data types from the group comprising: integer, character, floating point number, and pointer.

7. In a computing environment, a system comprising:
a compile-time construct that generates a data store in which arbitrary types of data elements are stored based on a key, the compile-time construct having mechanisms instantiated by a compiler to provide access to the data store, including a storage mechanism and a retrieval mechanism;
the storage mechanism configured to store an element having a data type and a key, the storage mechanism storing the element in the data store according to the key and in association with data type information; and
the retrieval mechanism configured to validate that a requested via its key and having a specified data type corresponds to the associated data type information of that element in the data store, and if so, to return data of the element in response to the request, and if not, to generate an exception.

8. The system of claim 7 wherein the compile-time construct is instantiated by the compiler, and wherein the storage mechanism and retrieval mechanism each comprise object methods accessed via an object interface.

9. The system of claim 7 wherein the compile-time construct generates the data store based on a typelist that lists types of data that the data store is to contain.

10. The system of claim 9 wherein the compile-time construct is instantiated by the compiler, and wherein the compile-time construct receives the typelist from the compiler after instantiation.

11. The system of claim 7 wherein the compile-time construct comprises a C++ template.

12. The system of claim 7 wherein the generated data store is operable to contain types from the group comprising: integer, character, floating point number, and pointer.

13. The system of claim 7 wherein the compile-time construct utilizes arbitrary data types to be processed as one or more source code modules that may be compiled by a compiler such that compiled code is generated.

14. In a computing environment, a system comprising:
 a compiler including means for compiling source code into compiled code;
 a compile-time construct means instantiated by the compiler, and for generating a data store to contain data of arbitrary types as stored elements referenced by keys;
 a storage means, the storage means receiving an element having a data type in a request to store the element as referenced by a key, the storage means storing the element in the data store referenced by the key and in association with data type information; and
 a retrieval means, the retrieval means operating in response to a request to return an element referenced by a key and having a specified data type, the retrieval means validating that the specified data type corresponds to the data type information associated with the element in the data store, and if so, the retrieval means returning data of the element in response to the request, and if not, the retrieval means generating an exception.

15. The system of claim 14 wherein the storage means and retrieval means each comprise object methods accessed via an object interface.

16. The system of claim 14 wherein the compile-time construct means includes means for generating the data store based on a typelist that lists types of data that the data store is to contain.

17. The system of claim 14 wherein the compile-time construct comprises a C++ template.

18. The system of claim 14, further comprising a linker operable to combine resulting compiled code and libraries into executable program code.

19. The system of claim 14 wherein the compiler is further operable to store and retrieve arbitrary data types of data that have been processed as one or more source code modules such that compiled code is generated.

20. The system of claim 14 wherein the generated data store is operable to contain types from the group comprising: integer, character, floating point number, and pointer.

* * * * *